(12) United States Patent
Mizuno et al.

(10) Patent No.: US 8,162,763 B2
(45) Date of Patent: Apr. 24, 2012

(54) SLIDING-TYPE TRIPOD CONSTANT VELOCITY JOINT

(75) Inventors: Koichiro Mizuno, Kashiwara (JP); Yoshinari Sakai, Takahama (JP); Tatsuya Yoshi, Kashihara (JP)

(73) Assignee: JTEKT Corporation, Osaka-shi (JP)

( * ) Notice: Subject to any disclaimer, the term of this patent is extended or adjusted under 35 U.S.C. 154(b) by 192 days.

(21) Appl. No.: 12/639,369

(22) Filed: Dec. 16, 2009

(65) Prior Publication Data

US 2010/0160051 A1    Jun. 24, 2010

(30) Foreign Application Priority Data

Dec. 19, 2008    (JP) .................................. 2008-324502
Dec. 22, 2008    (JP) .................................. 2008-325882

(51) Int. Cl.
*F16D 3/205* (2006.01)
(52) U.S. Cl. .......................... 464/111; 464/905; 384/44
(58) Field of Classification Search .................. 464/111, 464/120–123, 132, 905; 384/44, 565
See application file for complete search history.

(56) References Cited

U.S. PATENT DOCUMENTS

| 2,952,144 | A | * | 9/1960 | Holmes, Jr. ................... 464/132 |
| 4,828,534 | A | * | 5/1989 | Orain ............................ 464/111 |
| 5,073,144 | A | * | 12/1991 | Stenglein et al. ............ 464/111 |
| 5,160,297 | A | * | 11/1992 | Uchman ....................... 464/111 |
| 5,277,660 | A | * | 1/1994 | Uchman ....................... 464/111 |
| 2003/0045363 | A1 | | 3/2003 | Sugiyama et al. |

FOREIGN PATENT DOCUMENTS

| DE | 3936602 | * | 5/1991 | |
| JP | 59040016 | * | 3/1984 | .................. 464/111 |
| JP | 2763624 | | 3/1998 | |
| JP | 2003-65350 | | 3/2003 | |
| WO | WO 9215797 | * | 9/1992 | |

* cited by examiner

*Primary Examiner* — Gregory Binda
*Assistant Examiner* — Josh Skroupa
(74) *Attorney, Agent, or Firm* — Oblon, Spivak, McClelland, Maier & Neustadt, L.L.P.

(57) ABSTRACT

An intermediate member is rockably provided around an outer periphery of a corresponding one of tripod shaft portions. Shaft-like rolling elements are retained by corresponding retainers so that the shaft-like rolling elements are able to circulate around the corresponding intermediate members and are able to roll between side surfaces of a corresponding one of raceway grooves of an outer ring and a torque transmitting surface of a corresponding one of the intermediate members. Then, raceway recesses are formed on the side surfaces of each raceway groove so as to extend in a direction of a rotation axis of the outer ring. The shaft-like rolling elements are fitted in the corresponding raceway recesses and are able to roll along bottom surfaces of the respective raceway recesses. Thus, the retainers are arranged outside the raceway recesses.

12 Claims, 7 Drawing Sheets

FIG. 5D
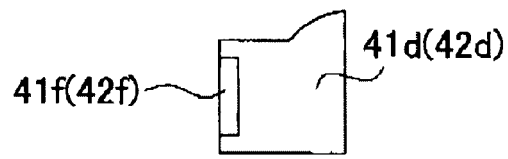
FIG. 5B        FIG. 5A        FIG. 5C
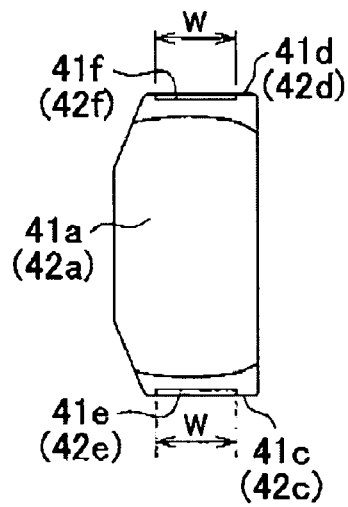 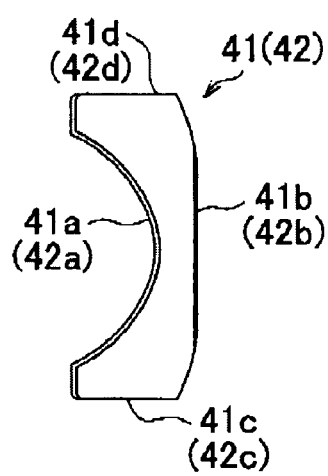 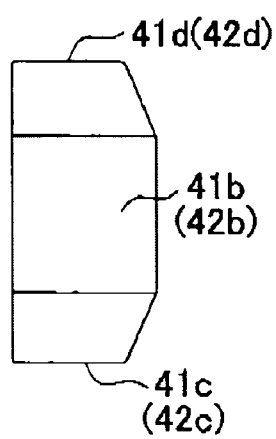
FIG. 5E
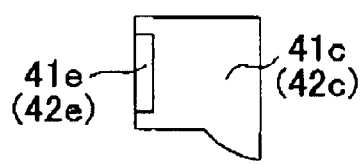

SLIDING-TYPE TRIPOD CONSTANT VELOCITY JOINT

INCORPORATION BY REFERENCE

The disclosure of Japanese Patent Applications No. 2008-324502 filed on Dec. 19, 2008 and No. 2008-325882 filed on Dec. 22, 2008 including the specifications, drawings and abstracts are incorporated herein by reference in its entirety.

BACKGROUND OF THE INVENTION

1. Field of the Invention

The invention relates to a sliding-type tripod constant velocity joint.

2. Description of the Related Art

For example, Japanese Patent Application Publication No. 2003-65350 (JP-A-2003-65350) describes an existing sliding-type tripod constant velocity joint. In the sliding-type tripod constant velocity joint described in JP-A-2003-65350, rolling elements are supported by retainers in a state where each of the rolling elements is positioned with respect to intermediate members. With the above configuration, as power is transmitted, not only rolling resistance but also large resistance due to sliding occurs between the rolling elements and the intermediate members and between the rolling elements and raceway grooves.

Then, Japanese Patent No. 2763624, for example, describes a sliding-type tripod constant velocity joint in order to reduce the resistance. In the sliding-type tripod constant velocity joint described in Japanese Patent No. 2763624, needles are employed as rolling elements, and the rolling elements are supported by retainers so that they can circulate around corresponding intermediate members. This can greatly reduce the resistance due to sliding between the rolling elements and the intermediate members and between the rolling elements and the raceway grooves.

Incidentally, when a needle is used as a rolling element, a skew appears in the needle. A skew means a state where the central axis of a needle is inclined with respect to a direction in which the needle rolls. A skew in a needle generates a force in the axial direction on the needle.

Therefore, in the constant velocity joint described in Japanese Patent No. 2763624, each needle reciprocally moves in the axial direction of the needle with respect to the raceway groove of an outer ring due to a skew. Both ends of each needle in the axial direction are retained so that the needle is held by the retainer. Thus, as the needles move in the axial direction with respect to the raceway groove, the retainer that retains the needles also moves in the axial direction of the needles with respect to the raceway groove.

Here, in the above constant velocity joint, each retainer is fitted to the raceway groove of the outer ring. Therefore, when a skew appears in the needles, the retainer is clamped between the needles and the raceway groove. In order to ensure sufficient durability of the retainer even when the retainer is clamped, it is necessary to set a high bending rigidity for the retainer. For example, the retainer is thickened or the retainer is subjected to heat treatment. The above process causes an increase in the cost and weight of the retainer.

SUMMARY OF THE INVENTION

The invention provides a sliding-type tripod constant velocity joint that is able to reduce the cost and weight of each retainer in such a manner that the retainer reduces a load received from needles and an outer ring.

A first aspect of the invention provides a sliding-type tripod constant velocity joint. The sliding-type tripod constant velocity joint includes: a cylindrical outer ring that has three raceway grooves on an inner peripheral surface thereof, the three raceway grooves extending in a direction of a rotation axis of the outer ring; a tripod that has a boss portion coupled to a shaft and three tripod shaft portions that extend from an outer peripheral surface of the boss portion outward in a radial direction of the boss portion and that are inserted in the corresponding raceway grooves; an intermediate member that is provided around an outer periphery of a corresponding one of the tripod shaft portions so as to be rockable with respect to the tripod shaft portion and that has a torque transmitting surface on an outer surface thereof, the torque transmitting surface facing side surfaces of a corresponding one of the raceway grooves; a plurality of shaft-like rolling elements that are provided between the side surfaces of each raceway groove and a corresponding one of the torque transmitting surfaces so as to be able to roll along the side surfaces of that raceway groove; and a retainer that supports the shaft-like rolling elements so that the shaft-like rolling elements are able to circulate around an outer periphery of a corresponding one of the intermediate members. A raceway recess is formed on each of the side surfaces of each raceway groove and extends in the direction of the rotation axis of the outer ring. Portions of the shaft-like rolling elements, located adjacent to each of the side surfaces of each raceway groove, are fitted in the corresponding raceway recess, and are able to roll along a bottom surface of the corresponding raceway recess. The retainers are arranged outside the raceway recesses.

With the above aspect, portions of the shaft-like rolling elements are fitted in the corresponding raceway recess. By so doing, when force that moves the shaft-like rolling elements in the axial direction occurs because of a skew, movement of the shaft-like rolling elements is restricted by the raceway recess. Furthermore, the retainers are arranged outside the raceway recesses. That is, the retainers each are not accommodated inside any of the raceway recesses. Thus, only the raceway recesses exhibit the effect of restricting movement of the shaft-like rolling elements due to a skew, and the retainers do not exhibit the effect of restricting the movement. In this way, with the above aspect of the invention, unlike the existing art, movement of the retainers and the shaft-like rolling elements due to a skew is restricted not by bringing the retainers themselves into contact with the outer ring. Therefore, it is possible to prevent a situation that the retainers contact with the outer ring to cause the retainers to receive a large load. As a result, it is not necessary to apply processes for improving the bending rigidity of each retainer, such as increasing the thickness of the plate and applying heat treatment. That is, it is possible to reduce the cost and weight of the retainers.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 5A to FIG. 5E are a front view (when viewed from the upper side in FIG. 4), left side view, right side view, plan view and bottom view of the split member 41, respectively;

DETAILED DESCRIPTION OF EMBODIMENTS

Hereinafter, a specific embodiment of a sliding-type tripod constant velocity joint (hereinafter, simply referred to as "constant velocity joint") according to the invention will be described with reference to the accompanying drawings. Here, the constant velocity joint according to the present embodiment will be described by taking the case where the constant velocity joint is used to couple a torque transmission shaft of a vehicle as an example. For example, this is the case where the constant velocity joint is used for a coupling portion at which a shaft portion coupled to a differential gear is coupled to an intermediate shaft of a drive shaft.

Figure 1:
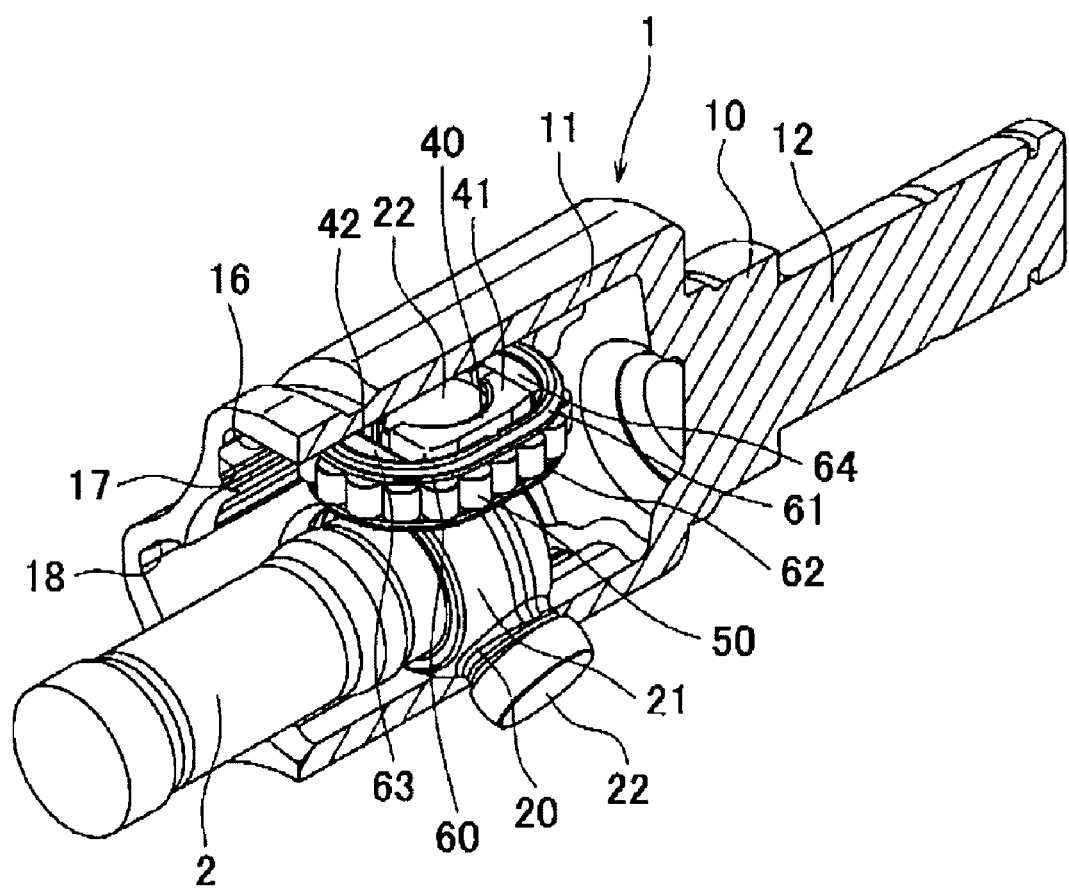
FIG. 1 is a perspective view of a constant velocity joint 1 with an outer ring 10 cut away in an axial direction.
Figure 2:
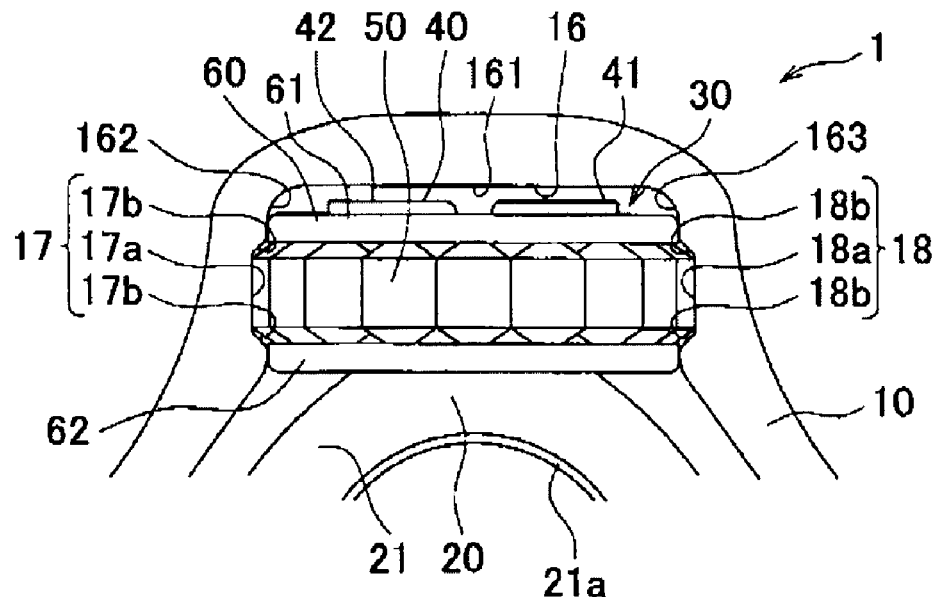
FIG. 2 is a view of part of the constant velocity joint 1 in an assembled state when viewed from an opening side of the outer ring 10.
Figure 3:
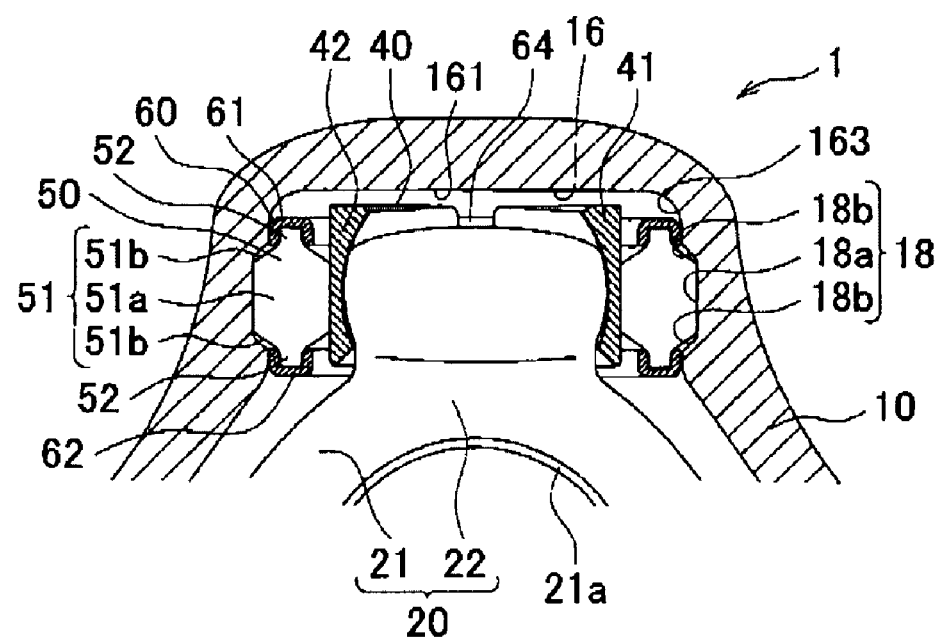
FIG. 3 is a radial cross-sectional view of part of the constant velocity joint 1.

The constant velocity joint 1 according to the present embodiment will be described with reference to FIG. 1 to FIG. 8. As shown in FIG. 1 to FIG. 3, the constant velocity joint 1 includes an outer ring 10, a tripod 20 and roller units 30.

As shown in FIG. 1, the outer ring 10 includes a cylindrical portion 11 and a coupling shaft portion 12. The cylindrical portion 11 has a closed-end cylindrical shape. The coupling shaft portion 12 is formed coaxially and integrally with the cylindrical portion 11 so as to extend from the bottom of the cylindrical portion 11 outward in the axial direction. The coupling shaft portion 12 is coupled to the differential gear (not shown).

Then, as shown in FIG. 1 to FIG. 3, three raceway grooves 16 are formed on the inner peripheral surface of the cylindrical portion 11 at equiangular intervals in the circumferential direction with respect to the rotation axis of the outer ring. The raceway grooves 16 extend in the direction of the rotation axis of the outer ring (in the front-rear direction in FIG. 2). The cross section of each raceway groove 16, taken perpendicularly to a direction in which the groove extends, has a U shape that opens toward the rotation axis center of the outer ring 10. That is, each raceway groove 16 has a groove bottom surface 161 and side surfaces 162 and 163. The groove bottom surface 161 is formed substantially in a plane shape. The side surfaces 162 and 163 have a substantially planar shape perpendicular to the groove bottom surface and face parallel to each other.

The side surfaces 162 and 163 respectively have raceway recesses 17 and 18 that extend in the direction of the rotation axis of the outer ring. The raceway recesses 17 and 18 are formed substantially at the center of the side surfaces 162 and 163 of the raceway groove 16 in the radial direction of the outer ring 10. The opening width (vertical width in FIG. 2 and FIG. 3) of each of the raceway recesses 17 and 18 is formed to gradually increase. That is, the raceway recess 17 has a substantially planar bottom portion 17a and inclined wall portions 17b, and the raceway recess 18 has a substantially planar bottom portion 18a and inclined wall portions 18b.

As shown in FIG. 1 and FIG. 3, the tripod 20 is arranged inside the cylindrical portion 11 of the outer ring 10. The tripod 20 includes a boss portion 21 and three tripod shaft portions 22. The boss portion 21 has an annular shape, and has an internal tooth spline 21a on its inner peripheral side. The internal tooth spline 21a is fitted and coupled to an external tooth spline formed at an end of an intermediate shaft 2. In addition, the outer peripheral surface of the boss portion 21 is formed substantially in a spherical convex shape.

Each tripod shaft portion 22 is formed to extend from the outer peripheral surface of the boss portion 21 outward in the radial direction of the boss portion 21. These tripod shaft portions 22 are formed at equiangular intervals (at intervals of 120 degrees) in the circumferential direction of the boss portion 21. Then, at least the distal end portion of each tripod shaft portion 22 is inserted in a corresponding one of the raceway grooves 16 of the cylindrical portion 11 of the outer ring 10. The outer peripheral surface of each tripod shaft portion 22 has a spherical convex shape. Here, a straight line that passes through a location near the center of curvature of the spherical convex shape and that is perpendicular to the rotation axis of the tripod 20 (rotation axis of the intermediate shaft 2) becomes a central axis of each tripod shaft portion 22 (hereinafter, also referred to as "tripod axis").

As shown in FIG. 1, each roller unit 30 has an annular shape as a whole, and is arranged on the outer peripheral side of a corresponding one of the tripod shaft portions 22. Furthermore, each roller unit 30 is fitted to a corresponding one of the raceway grooves 16 so that the roller unit 30 is movable in the direction in which the raceway groove 16 extends. Each roller unit 30 includes an intermediate member 40, a plurality of rolling elements 50 and a retainer 60.

As shown in FIG. 1 and FIG. 3, the intermediate member 40 is formed of a pair of split members 41 and 42. When the pair of split members 41 and 42 are viewed as one unit, the outer shape of the intermediate member 40 as a whole is substantially rectangular. Furthermore, when the intermediate member 40 is viewed as a whole, a portion corresponding to a circular hole is formed at the center of the intermediate member 40.

The pair of split members 41 and 42 are separately formed from each other so as to have plane-symmetrical shapes with respect to a plane that passes through the tripod axis (extending in the vertical direction in FIG. 3) and the rotation axis of the intermediate shaft 2 (extending in the front-rear direction in FIG. 3), and are independent of each other. Then, as shown in FIG. 1 and FIG. 3, the pair of split members 41 and 42 are arranged so as to sandwich the tripod shaft portion 22 from both sides of the side surfaces 162 and 163 of the raceway groove 16. That is, both split members 41 and 42 are arranged so as to sandwich the tripod shaft portion 22 from both sides in a torque transmitting direction (a direction around the rotation axis of the outer ring or around the rotation axis of the intermediate shaft). Then, the pair of split members 41 and 42 are rockable with respect to the tripod shaft portion 22 when viewed from all directions perpendicular to the axis of the tripod shaft portion 22.

Here, the detailed shape of the split member 41 will be described with reference to FIG. 4 and FIG. 5. Note that the other split member 42 and the split member 41 are symmetrical as described above, so reference numerals are denoted in parentheses in the drawing only, and the detailed description of the split member 42 is omitted.

The split member 41 has a rectangular block shape. The outer peripheral surface of the split member 41 has a tripod contact surface 41a, a torque transmitting surface 41b and axial end surfaces 41c and 41d. Here, when the intermediate member 40 is viewed as one unit, the tripod contact surface 41a forms an inner peripheral surface, and the torque transmitting surface 41b and the axial end surfaces 41c and 41d form an outer peripheral surface.

The tripod contact surface 41a has a partially spherical concave shape such that the tripod contact surface 41a is in rockable contact with the tripod shaft portion 22 when viewed from all directions perpendicular to the axis of the tripod shaft portion 22. Then, the center of the spherical surface of the tripod contact surface 41a is located near the center of the width of the tripod contact surface 41a in the vertical direction (the thickness of the split member 41) in FIG. 3 and near the center of the width of the tripod shaft portion 22 in the front-rear direction in FIG. 3 (the length of the split member 41 in the longitudinal direction). That is, the tripod contact surface 41a is fitted to the outer peripheral surface of the tripod shaft portion 22, and has a shape such that the tripod contact surface 41a does not come off in the axial direction of the tripod shaft portion 22 in a state where it is fitted to the outer peripheral surface of the tripod shaft portion 22.

Figure 4:
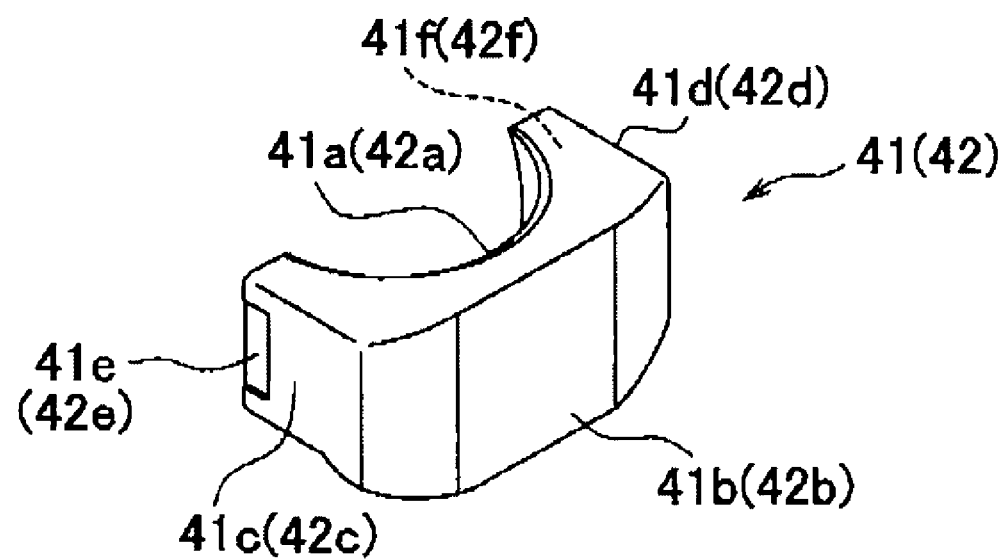
FIG. 4 is a perspective view of a split member 41 of an intermediate member 40 and shows a split member 42 in parentheses.
Figure 6:
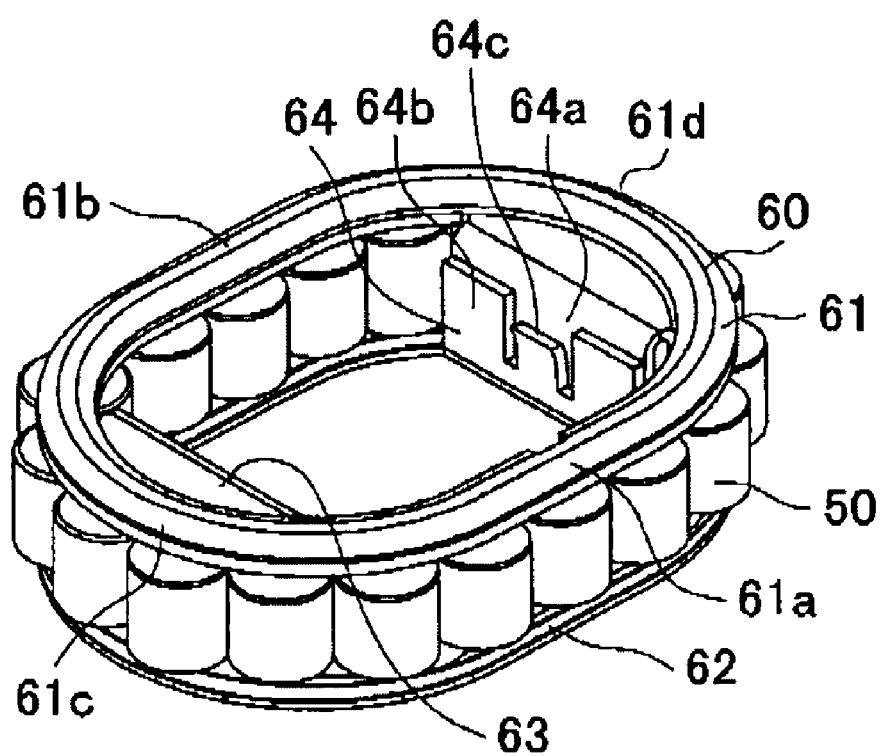
FIG. 6 is a perspective view of a state where shaft-like rolling elements 50 are assembled to a retainer 60.

The torque transmitting surface 41b is provided on the opposite side with respect to the tripod contact surface 41a, that is, on the front right side of FIG. 4. The torque transmitting surface 41b has a substantially planar and rectangular shape. Both ends of the torque transmitting surface 41b in the direction of the rotation axis of the outer ring are formed to be slightly curved. That is, in FIG. 3, the center of the torque transmitting surface 41b maximally protrudes outward in the horizontal direction in FIG. 3.

Then, the split member 41 is arranged so that the torque transmitting surface 41b of the split member 41 faces the side surface 163 of the raceway groove 16 substantially parallel to the side surface 163. Note that, similarly, the other split member 42 is also arranged so that the torque transmitting surface 42b faces the side surface 162 of the raceway groove 16 substantially parallel to the side surface 162. That is, in a position in which the rotation axis of the outer ring 10 coincides with the rotation axis of the intermediate shaft 2 (joint angle is zero degrees), the torque transmitting surface 41b is substantially parallel to a plane that passes through the central axis of the tripod shaft portion 22 and the rotation axis of the intermediate shaft 2. Then, the torque transmitting surface 41b spans a range in which the torque transmitting surface 41b is contactable with the plurality of (3 to 4 in the present embodiment) shaft-like rolling elements 50.

The axial end surfaces 41c and 41d are located at the front left side and rear right side in FIG. 4, that is, both ends of the split member 41 in the longitudinal direction. Both axial end surfaces 41c and 41d each are formed of a plane that is substantially perpendicular to the torque transmitting surface 41b. That is, the axial end surfaces 41c and 41d each are formed of a plane that is substantially perpendicular to the side surface 163 of the raceway groove 16.

Recesses 41e and 41f are respectively formed in the axial end surfaces 41c and 41d at portions adjacent to the split member 42. The recesses 41e and 41f each have a rectangular shape having the axial direction of the tripod shaft portion 22 as the longitudinal direction in a state where the split member 41 is assembled to the tripod shaft portion 22. The recesses 41e and 41f respectively have ribs at both horizontal sides in FIG. 5B, that is, at both sides in the radial direction of the outer ring 10. Protrusions 63c and 64c of the retainer 60 (discussed later) hook on the ribs. Then, the width W in the longitudinal direction, that is, the distance W between both ribs, of each of the recesses 41e and 41f is larger than or equal to a distance at which the tripod shaft portion 22 is movable with respect to the retainer 60 in the radial direction of the outer ring 10.

As shown in FIG. 1 to FIG. 3 and FIG. 6, each shaft-like rolling element 50 is a large-diameter needle. Then, as shown in FIG. 1, the plurality of shaft-like rolling elements 50 are provided so as to circulate around the outer periphery of a corresponding one of the intermediate members 40 when the intermediate member 40 is viewed as one unit. A portion of (3 to 4 in the present embodiment) the plurality of shaft-like rolling elements 50 are provided between the side surfaces 162 and 163 of the raceway groove 16 and the torque transmitting surfaces 41b and 42b of the pair of split members 41 and 42 so as to be able to roll along the side surfaces 162 and 163 of the raceway groove 16 and the torque transmitting surfaces 41b and 42b. That is, torque is transmitted via the shaft-like rolling elements 50 between the torque transmitting surfaces 41b and 42b and the side surfaces 162 and 163 of the raceway groove 16.

Each shaft-like rolling element 50 has a circular cylinder-shaped rolling surface portion 51 and protruding portions 52. The rolling surface portion 51 has a rolling surface 51a on its outer periphery. The protruding portions 52 each have a circular cross section when the cross section is taken in a direction perpendicular to a direction in which the cylinder is extended (horizontal direction in FIG. 2), and protrudes respectively from both end surfaces of the rolling surface portion 51 in the axial direction. The cylinder extension length of the rolling surface 51a formed on the outer peripheral surface of the rolling surface portion 51 is equal to the width of each of bottom surface portions 17a and 18a of the raceway recesses 17 and 18 or is slightly shorter than the width of each of the bottom surface portions 17a and 18a.

Both end surfaces of the rolling surface portion 51 are tapered. The tapered end surfaces 51b have a substantially similar taper shape to that of the wall portions 17b and 18b of the raceway recesses 17 and 18. That is, the rolling surface portion 51 is provided so that a portion of the rolling surface portion 51, located adjacent to the side surface of the raceway groove, is fitted in the raceway recess 17 or 18. Specifically, the tapered end surfaces 51b are engaged with the wall portions 17b and 18b of the raceway recess 17 or 18 in the axial direction of the shaft-like rolling element 50. That is, each shaft-like rolling element 50 is restricted by the raceway recess 17 or 18 from moving in the axial direction of the shaft-like rolling element 50. Then, the rolling surface 51a on the outer periphery of the rolling surface portion 51 is able to roll along the bottom surfaces 17a and 18a of the raceway recesses 17 and 18.

Each protruding portion 52 has a smaller diameter than the outside diameter of the rolling surface portion 51. Then, the distance between the distal ends of the protruding portions 52 at both sides, that is, the length of the shaft-like rolling element 50 in the axial direction, is longer than the opening width of the bottom surface portion 17a or 18a of the raceway recess 17 or 18. That is, the protruding portions 52 are located outside the raceway recesses 17 or 18.

As shown in FIG. 6 and FIG. 7A to FIG. 7C, each retainer 60 has an annular shape as a whole. The retainer 60 supports the shaft-like rolling elements 50 so that the shaft-like rolling elements 50 are able to circulate around the outer periphery of the intermediate member 40. Then, the retainer 60 is almost accommodated inside the raceway groove 16. The retainer 60 includes a pair of circulation path forming members 61 and 62 and a pair of coupling portions 63 and 64. The pair of circulation path forming members 61 and 62 form a circulation path for the shaft-like rolling elements 50. The pair of coupling portions 63 and 64 couple the pair of circulation path forming members 61 and 62.

The pair of circulation path forming members 61 and 62 are located at the periphery of the retainer 60, and each have an oblong shape. The pair of circulation path forming members 61 and 62 are formed to surround the pair of split members 41 and 42. Specifically, the circulation path forming member 61 is formed of opposite straight portions 61a and 61b and semicircular arcuate curved portions 61c and 61d. The curved portions 61c and 61d couple the straight portions 61a and 61b. In addition, the other circulation path forming member 62 is formed of straight portions and curved portions, as in the case of the circulation path forming member 61.

Furthermore, the pair of circulation path forming members 61 and 62 are arranged to face each other so as to sandwich the shaft-like rolling elements 50 in the axial direction of the shaft-like rolling elements 50. The protruding portions 52 of each shaft-like rolling element 50 are inserted into the pair of circulation path forming members 61 and 62, and the pair of circulation path forming members 61 and 62 are formed to have a U-shaped cross section so as to engage with the tapered end surfaces 51b of the rolling surface portion 51. In this way, the pair of circulation path forming members 61 and 62 support both protruding portions 52. That is, the width of each of the pair of circulation path forming members 61 and 62 in the radial direction (the distance between the inner periphery and the outer periphery) is smaller than the maximum diameter of the rolling surface portion 51 of each shaft-like rolling element 50. Thus, the rolling surface portion 51 of each shaft-like rolling element 50 protrudes outward from the outer peripheries of the pair of circulation path forming members 61 and 62, and protrudes inward from the inner peripheries of the pair of circulation path forming members 61 and 62.

Then, the U-shaped opening sides of the respective circulation path forming members 61 and 62 face each other in a state where the U-shaped opening sides are spaced apart at a distance that is slightly longer than the length of the rolling surface portion 51 of the shaft-like rolling element 50 in the axial direction. Thus, the maximum distance between the pair of circulation path forming members 61 and 62 in the facing direction is longer than the opening width of each of the raceway recesses 17 and 18. Then, the pair of circulation path forming members 61 and 62 are accommodated inside the raceway groove 16, and are located outside the raceway recesses 17 and 18.

Furthermore, the distance between the straight portions 61a and 61b of the pair of circulation path forming members 61 and 62 is shorter than the width of the raceway groove 16 (distance between the opening portion of the raceway recess 17 and the opening portion of the raceway recess 18). That is, the pair of circulation path forming members 61 and 62 are respectively arranged at a gap from the side surfaces 162 and 163 of the raceway groove 16.

The pair of coupling portions 63 and 64 respectively couple the center portions (upper and lower end portions in FIG. 7A) of the curved portions 61c and 61d of the pair of circulation path forming members 61 and 62 in the circumferential direction. That is, other than the coupling portions 63 and 64, space is formed between the pair of circulation path forming members 61 and 62.

Figure 7C:
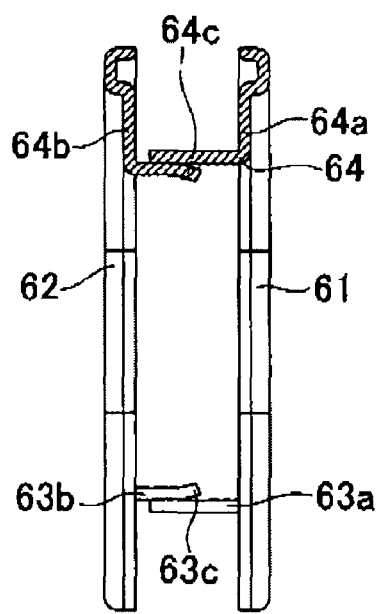
FIG. 7C is a cross-sectional view taken along the line B-B in FIG. 7A.
Figure 7A:
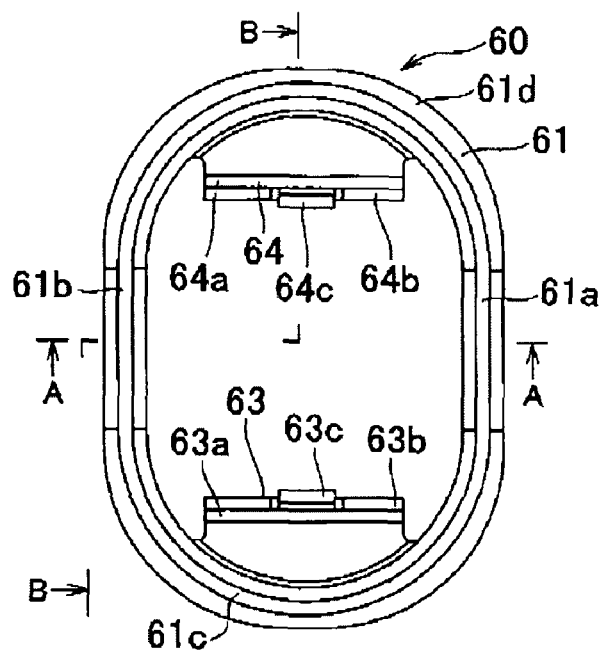
FIG. 7A is a front view of the retainer 60.
Figure 7B:
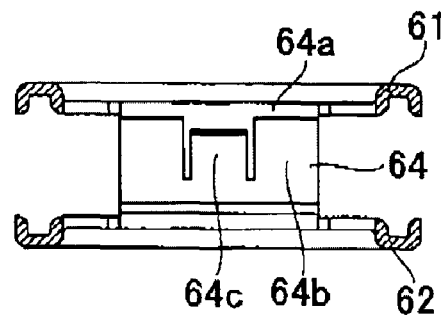
FIG. 7B is a cross-sectional view taken along the line A-A in FIG. 7A.
Figure 8:
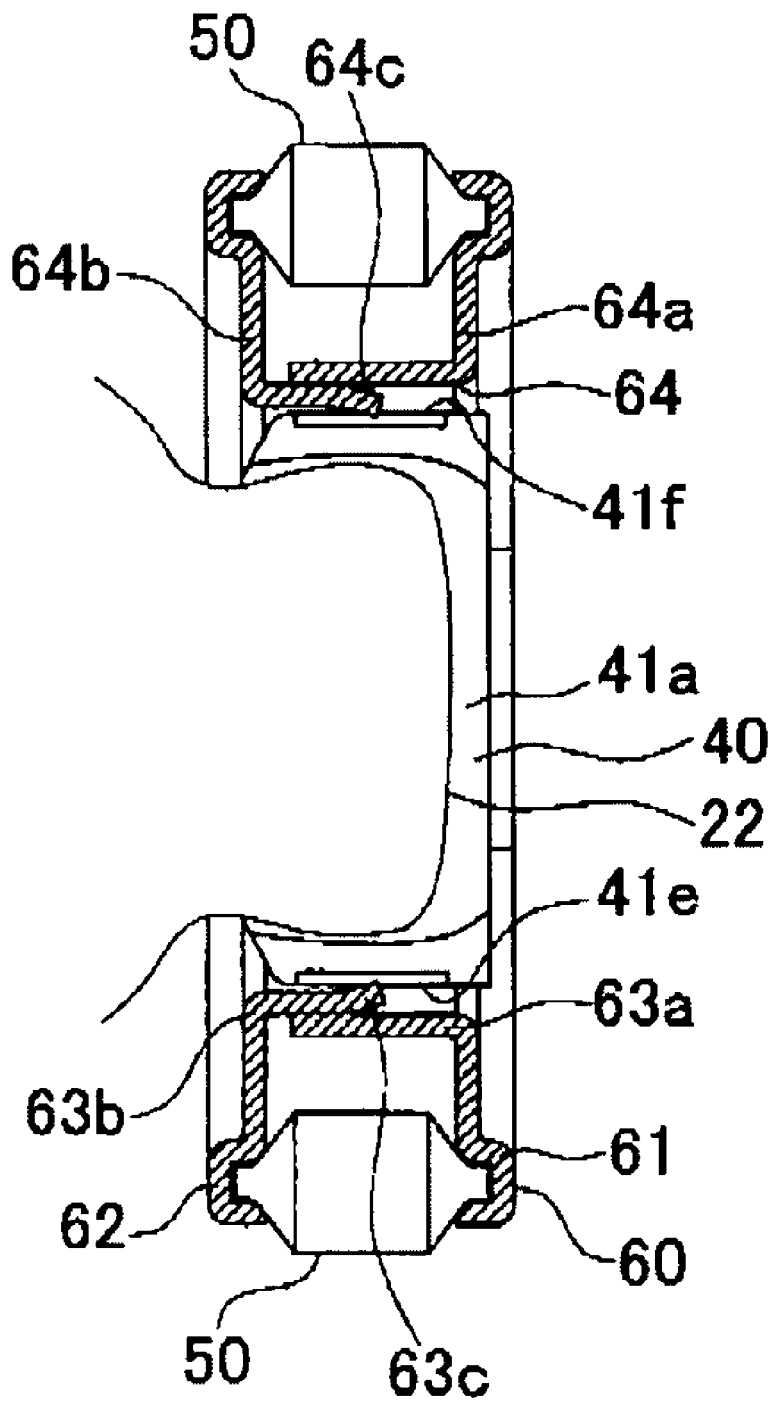
FIG. 8 is a cross-sectional view of the constant velocity joint 1, taken in a direction of a rotation axis of the outer ring, except the outer ring 10.

As shown in FIG. 7C, the coupling portions 63 and 64 are formed in a U shape that opens outward of the retainer 60 as a whole. The coupling portion 63 is formed of a first L-shaped member 63a, a second L-shaped member 63b and a protrusion 63c. The coupling portion 64 is formed of a first L-shaped member 64a, a second L-shaped member 64b and a protrusion 64c.

The first L-shaped members 63a and 64a each have an L shape. One walls of the first L-shaped members 63a and 64a are connected to the respective center portions in the circumferential direction on the inner sides of the curved portions 61c and 61d of the circulation path forming member 61, and are located in the substantially same plane as that of the circulation path forming member 61. The other walls of the first L-shaped members 63a and 64a are formed to be bent from the one walls toward the U-shaped opening sides of the circulation path forming member 61 so as to face parallel to each other.

The second L-shaped members 63b and 64b have substantially the same L shape as those of the first L-shaped members 63a and 64a. One walls of the second L-shaped members 63b and 64b are connected to the respective center portions in the circumferential direction on the inner sides of the curved portions (corresponding to 61c and 61d) of the circulation path forming member 62, and are located in the substantially same plane as that of the circulation path forming member 62. The other walls of the second L-shaped members 63b and 64b are formed to be bent from the one walls toward the U-shaped opening sides of the circulation path forming member 62 so as to face parallel to each other. At this time, the other walls of the second L-shaped members 63b and 64b are bonded to the other walls of the first L-shaped members 63a and 64a on the surfaces adjacent to the center of the retainer 60 by welding, or the like.

Then, the protrusions 63c and 64c are slightly curved from the other walls of the second L-shaped members 63b and 64b and are integrally formed with the other walls. That is, the protrusions 63c and 64c protrude toward the center of the retainer 60 as compared with the other walls of the first L-shaped members 63a and 64a and the other walls of the second L-shaped members 63b and 64b. Here, the protrusions 63c and 64c function as leaf springs that are supported by the first L-shaped members 63a and 64a. That is, the protrusions 63c and 64c are elastically deformable. The protrusions 63c and 64c respectively protrude toward the pair of recesses 41e and 42e and pair of recesses 41f and 42f of the split members 41 and 42 and are respectively inserted in the pair of recesses 41e and 42e and the pair of recesses 41f and 42f (see FIG. 8).

Then, in a state where the shaft-like rolling elements 50 are located in the raceway recesses 17 and 18 at locations closest to the bottom side (upper side in FIG. 3) of the raceway groove 16 and the retainer 60 is located closest to the bottom side of the raceway groove 16 with respect to the shaft-like rolling elements 50, a gap is formed between the retainer 60 and the groove bottom surface 161 of the raceway groove 16. The gap is regulated on the basis of the displacement in the axial direction between the raceway recesses 17 and 18 and the rolling surface portions 51, the displacement in the axial direction between the shaft-like rolling elements 50 and the retainer 60, the thickness of each of the pair of circulation path forming members 61 and 62 of the retainer 60 in the axial direction, and the like.

Furthermore, an opening portion of the raceway groove 16 is located on an inner side of the retainer 60 in the radial direction of the outer ring 10. That is, the circulation path forming member 62 located at the inner side of the retainer 60 in the radial direction of the outer ring 10 is in contact with the shaft-like rolling elements 50 on the outer side in the radial direction of the outer ring 10; however, the circulation path forming member 62 is not restricted by anything on the inner side in the radial direction of the outer ring 10.

Next, the procedure of assembling the above described constant velocity joint 1 will be described. First, the retainer 60 is formed by pressing. Specifically, the circulation path forming member 61 and the first L-shaped members 63a and 64a are formed by pressing steel plate. In addition, the other circulation path forming member 62, the second L-shaped members 63b and 64b and the protrusions 63c and 64c are also formed by pressing steel plate. Then, the first L-shaped members 63a and 64b are connected to the second L-shaped members 63b and 64b by spot welding. In this way, the retainer 60 is formed. Three of the retainers 60 are prepared.

Subsequently, the plurality of shaft-like rolling elements 50 are inserted into the circulation paths of the respective retainers 60, that is, between the pair of circulation path forming members 61 and 62. Subsequently, the pair of split members 41 and 42 are arranged to sandwich the outer periphery of a corresponding one of the tripod shaft portions 22 of the tripod 20. In this state, the retainer 60 is fitted around the pair of split members 41 and 42.

At this time, the protrusion 63c hooks on the ribs of the recesses 41e and 42e, and the protrusion 64c hooks on the ribs of the recesses 41f and 42f. Therefore, the protrusion 63c is elastically deformed so as to be spaced away from the center of the retainer 60 while the protrusion 63c passes over the ribs of the recesses 41e and 42e. Similarly, the protrusion 64c is elastically deformed so as to be spaced away from the center of the retainer 60 while the protrusion 64c passes over the ribs of the recesses 41f and 42f. After the protrusion 63c passes over the ribs of the recesses 41e and 42e, the protrusion 63c is inserted in the recesses 41e and 42e. Similarly, after the protrusion 64c passes over the ribs of the recesses 41f and 42f, the protrusion 64c is inserted in the recesses 41f and 42f. Thus, the protrusion 63c hooks on both ribs of the recesses 41e and 42e, and the protrusion 64c hooks on both ribs of the recesses 41f and 42f. Similarly, the pair of split members 41 and 42 and the retainer 60 are fitted to the other tripod shaft portions 22.

In this way, the tripod 20, the pairs of split members 41 and 42, the retainers 60 and the shaft-like rolling elements 50 are integrally held, and this state is maintained. Thus, the protrusion 63c is relatively movable inside the recesses 41e and 42e by the width W of the recesses 41e and 42e in the longitudinal direction, and the protrusion 64c is relatively movable inside the recesses 41f and 42f by the width W of the recesses 41f and 42f in the longitudinal direction.

Subsequently, the integrated component assembled as described above is fitted inside the cylindrical portion 11 of the outer ring 10. Specifically, each of the retainers 60 is fitted in a corresponding one of the raceway grooves 16 of the cylindrical portion 11. In this way, assembling of the constant velocity joint 1 is completed.

The operation of the above described constant velocity joint 1 will be described. One end of the outer ring 10 is coupled to the differential gear. As the outer ring 10 receives torque to rotate, the torque is transmitted from the outer ring 10 to the shaft-like rolling elements 50 that are fitted in the raceway recesses 17 and 18 of each raceway groove 16. Then, the torque is transmitted from the shaft-like rolling elements 50 to any of the pair of split members 41 and 42 that is in contact with the shaft-like rolling elements 50 transmitting the torque. Then, the torque is transmitted from any of the split members 41 and 42, serving as a torque transmitting side, to a corresponding one of the tripod shaft portions 22.

Then, the shaft-like rolling elements 50 are supported so as to be able to circulate around the outer periphery of a corresponding one of the intermediate members 40. Thus, the shaft-like rolling elements 50 roll between the torque transmitting surfaces 41b and 42b of any of the split members 41 and 42, transmitting torque, and the raceway recesses 17 and 18 of the raceway groove 16 without causing a slip in the extending direction of the raceway groove 16 with respect to the raceway recesses 17 and 18 or the torque transmitting surfaces 41b and 42b. By so doing, it is possible to suppress occurrence of induced thrust force.

In addition, any of the pair of split members 41 and 42, receiving the torque via the plurality of shaft-like rolling elements 50, transmits the torque to the tripod shaft portion 22 that contacts with the tripod contact surfaces 41a and 42a. At this time, when the joint angle is added as described above, each tripod shaft portion 22 reciprocally moves in the radial direction of the outer ring 10. Therefore, the split members 41 and 42 that are spherically fitted to a corresponding one of the tripod shaft portions 22 follow the tripod shaft portion 22, so the split members 41 and 42 slide over the shaft-like rolling elements 50 in the radial direction of the outer ring 10. By so doing, a load point of the torque transmitting surface 41b and 42b, to which torque is maximally applied, reciprocally moves in the axial direction of each shaft-like rolling element 50.

However, the pair of split members 41 and 42 are independent of each other at the torque transmitting side and at the opposite side. By so doing, even when a point of a load that occurs at the torque transmitting side and that is applied from the tripod shaft portion 22 changes, the action of one of the pair of split members 41 and 42, transmitting torque, does not influence the action of the other one of the split members 41 and 42, located at the opposite side. Thus, because any of the split members 41 and 42, located at the opposite side, is able to prevent application of large force to the raceway groove 16, this can suppress occurrence of induced thrust force.

Furthermore, with the above described constant velocity joint 1, the shaft-like rolling elements 50 are fitted in the raceway recess 17 or 18. By so doing, when force that moves the shaft-like rolling elements 50 in the axial direction occurs because of a skew, movement of the shaft-like rolling elements 50 is restricted by the raceway recesses 17 and 18. Incidentally, each retainer 60 is arranged outside the raceway recesses 17 and 18. Thus, only the raceway recesses 17 and 18 exhibit the effect of restricting movement of the shaft-like rolling elements 50 due to a skew, and the retainer 60 does not exhibit the effect of restricting the movement. That is, movement of each retainer 60 and the shaft-like rolling elements 50 due to a skew is restricted not by bringing the retainer 60 itself into contact with the outer ring 10.

Particularly, in a state where the shaft-like rolling elements 50 are located in the raceway recesses 17 and 18 at locations closest to the groove bottom surface 161 of the raceway groove 16 and the retainer 60 is located closest to the groove bottom surface 161 of the raceway groove 16 with respect to the shaft-like rolling elements 50, a gap is formed between the retainer 60 and the groove bottom surface 161 of the raceway groove 16. By so doing, even when a skew occurs, it is possible to prevent the retainer 60 from contacting with the groove bottom surface 161 of the raceway groove 16 of the outer ring 10.

Furthermore, each retainer 60 is arranged at a gap from the side surfaces 162 and 163 of a corresponding one of the raceway grooves 16. By so doing, it is possible to prevent the retainer 60 from contacting with the side surfaces 162 and 163 of the raceway groove 16. In addition, the opening portion of the raceway groove 16 is located on an inner side of the retainer 60 in the radial direction of the outer ring 10. Thus, even when the retainer 60 is moved inward in the radial direction of the outer ring 10 with respect to the outer ring 10, it is possible to prevent the retainer 60 from contacting with the components of the outer ring 10.

By so doing, it is possible to prevent a situation that retainer 60 contacts with the outer ring 10 to cause the retainer 60 to receive a large load. As a result, it is not necessary to apply process for improving the bending rigidity of the retainers 60, such as increasing the thickness of the plate and applying heat treatment. That is, it is possible to reduce the cost and weight of the retainers 60.

In this way, the retainers 60 are able to avoid contact with the outer ring 10, so the retainers 60 do not need to have a high bending rigidity more than necessary. That is, it is only necessary for each retainer 60 to have a bending rigidity that can form the circulation path of the shaft-like rolling elements 50 and regulate the position of a corresponding one of the intermediate members 40. As long as the above conditions are satisfied, it is applicable that the retainers 60 are, for example, not made of metal but, for example, made of resin by integral molding. Of course, the retainers 60 may be made of metal, and may be formed by low-cost press molding that allows easy molding.

Incidentally, as described in the procedure of assembling the constant velocity joint 1, the protrusion 63c of each retainer 60 is inserted in the recesses 41e and 42e of the pair of split members 41 and 42, and the protrusion 64c of each retainer 60 is inserted in the recesses 41f and 42f of the pair of split members 41 and 42. Then, when the constant velocity joint 1 transmits torque, each tripod shaft portion 22 relatively moves in the radial direction of the outer ring 10 with respect to the corresponding raceway grooves 16 of the cylindrical portion 11 of the outer ring 10. In this state, the operation of the protrusions 63c and 64c of each retainer 60 and the operation of the recesses 41e and 42e and recesses 41f and 42f of the pair of split members 41 and 42 will be described.

The pair of split members 41 and 42 are fitted on the outer peripheral surface of the tripod shaft portion 22. Thus, the pair of split members 41 and 42 rock with respect to a corresponding one of the tripod shaft portions 22 while moving in the radial direction of the outer ring 10 together with the tripod shaft portion 22. On the other hand, each retainer 60 is fitted in the raceway groove 16 of the cylindrical portion 11 of the outer ring 10. Thus, each retainer 60 is movable in the direction in which the raceway groove 16 extends; however, movement of the retainer 60 in the radial direction of the outer ring 10 is restricted.

At this time, the protrusions 63c and 64c of each retainer 60 are allowed to relatively move in the radial direction of the outer ring 10 by the amount of the width W thereof in the recesses 41e and 42e and recesses 41f and 42f of the pair of split members 41 and 42. Thus, when each retainer 60 is restricted in the radial direction of the outer ring 10 and the pair of split members 41 and 42 are movable in the radial direction of the outer ring 10, the fact that the protrusions 63c and 64c are inserted in the recesses 41e and 42e and the recesses 41f and 42f does not have any influence.

With the present embodiment, the protrusions 63c and 64c of each retainer 60 and the recesses 41e and 42e and recesses 41f and 42f of the pair of split members 41 and 42 allow the retainer 60 to move a predetermined distance in the radial direction of the outer ring 10 with respect to the intermediate member 40 during transmission of torque, and functions as a movement restricting portion that restricts relative movement when the amount of relative movement in the radial direction of the outer ring 10 between the retainer 60 and the intermediate member 40 exceeds the predetermined distance.

By so doing, when the constant velocity joint 1 is assembled or disassembled, it is possible to prevent the retainers 60 from coming off the corresponding intermediate members 40. Thus, assembling of the constant velocity joint 1 is considerably easy, and maintenance during disassembling of the constant velocity joint 1 is also considerably easy. In addition, the protrusions 63c and 64c and the recesses 41e and 42e and recesses 41f and 42f allow the relative movement between the retainer 60 and the intermediate member 40 by a predetermined distance. Thus, when torque is transmitted between the tripod 20 and the outer ring 10 after assembling the constant velocity joint 1, even when any of the intermediate members 40 moves in the radial direction of the outer ring 10 with respect to the outer ring 10 together with a corresponding one of the tripod shaft portions 22, the retainer 60 is able to stably hold the shaft-like rolling elements 50 at predetermined positions.

In addition, with the configuration that the protrusions 63c and 64c are elastically deformable, the protrusions 63c and 64c are able to easily pass over the ribs of the recesses 41e and 42e and recesses 41f and 42f. Thus, it is easy to assemble each intermediate member 40 with a corresponding one of the retainers 60.

Here, each intermediate member 40 contributes to torque transmission, whereas each retainer 60 does not contribute to torque transmission, so it is only necessary that each retainer 60 is able to retain the shaft-like rolling elements 50. Then, by providing the protrusions 63c and 64c for each retainer 60 that may be formed to have a relatively low rigidity, the protrusions 63c and 64c may be easily formed to be elastically deformable. Particularly, steel plate is pressed to form each retainer 60. Thus, each retainer 60 may be easily formed so that the protrusions 63c and 64c are elastically deformable.

In addition, the protrusions 63c and 64c and the recesses 41e and 42e and recesses 41f and 42f are provided on both sides of each tripod shaft portion 22. By so doing, it is possible to reliably prevent each retainer 60 from coming off from a corresponding one of the intermediate members 40.

In addition, as described above, with the present embodiment, each intermediate member 40 is formed of the pair of separated split members 41 and 42. By so doing, each intermediate member 40 may be easily assembled to a corresponding one of the tripod shaft portions 22. In addition, by forming each intermediate member 40 from the pair of separated split members 41 and 42, as described above, it is possible to suppress contact between each intermediate member 40 and a corresponding one of the raceway grooves 16 of the outer ring 10 at the side opposite to the surface that transmits torque. Furthermore, even when each intermediate member 40 is formed of the pair of separated split members 41 and 42, by forming the pair of split members 41 and 42 to have a shape by which the pair of split members 41 and 42 can be fitted on the outer peripheral surface of the tripod shaft portion 22, it is possible to prevent each intermediate member 40 and each retainer 60 from coming off from a corresponding one of the tripod shaft portions 22 in a state where the retainer 60 is assembled to the pair of split members 41 and 42.

Other Embodiments

In the above embodiment, each intermediate member 40 is formed of the pair of independent split members 41 and 42. Instead, each intermediate member 40 may have a single-piece structure. However, in this case, the advantageous effects owing to the above described split members 41 and 42 are not obtained.

In addition, in the above embodiment, the wall portions 17b and 18b and the tapered end surfaces 51b are tapered; however, they are not limited to a tapered shape.

In addition, in the above embodiment, the protrusions 63c and 64c of each retainer 60 and the recesses 41e and 42e and recesses 41f and 42f of the pair of split members 41 and 42 are provided on both sides of a corresponding one of the tripod shaft portions 22. Other than the above, as long as sufficient retention force may be ensured, only the protrusion 63c and the recesses 41e and 42e may be formed. In addition, in the above embodiment, the protrusions 63c and 64c of each retainer 60 are elastically deformable. Instead, the ribs of the recesses 41e and 42e and recesses 41f and 42f of the pair of split members 41 and 42 may be formed to be elastically deformable. However, it may be difficult depending on the material of the split members 41 and 42, so it is easy to have the above described configuration that the protrusions 63c and 64c of the retainer 60 are elastically deformable.

In addition, the protrusions 63c and 64c are provided for each retainer 60, and the recesses 41e and 42e and the recesses 41f and 42f are provided for the pair of split members 41 and 42. Instead, the member provided with the protrusions and the member provided with the recesses may be interchanged. In this case, it is only necessary that at least any one of the protrusions and the ribs of the recesses are formed to be elastically deformable.

The sliding-type tripod constant velocity joint according to the embodiment of the invention includes: a cylindrical outer ring that has three raceway grooves on an inner peripheral surface thereof, the three raceway groove extending in a direction of a rotation axis of the outer ring; a tripod that has a boss portion coupled to a shaft and three tripod shaft portions that extend from an outer peripheral surface of the boss portion outward in a radial direction of the boss portion and that are inserted in the corresponding raceway grooves; an intermediate member that is provided around an outer periphery of a corresponding one of the tripod shaft portions so as to be rockable with respect to the tripod shaft portion and that has a torque transmitting surface on an outer surface thereof, the torque transmitting surface facing side surfaces of a corresponding one of the raceway grooves; a plurality of shaft-like rolling elements that are provided between the side surfaces of each raceway groove and a corresponding one of the torque transmitting surfaces so as to be able to roll along the side surfaces of that raceway groove; and a retainer that supports the shaft-like rolling elements so that the shaft-like rolling elements are able to circulate around an outer periphery of a corresponding one of the intermediate members. A raceway recess is formed on each of the side surfaces of each raceway groove and extends in the direction of the rotation axis of the outer ring. Portions of the shaft-like rolling elements, located adjacent to each of the side surfaces of each raceway groove, are fitted in the corresponding raceway recess, and are able to roll along a bottom surface of the corresponding raceway recess. The retainers are arranged outside the raceway recesses.

In this embodiment, portions of the shaft-like rolling elements are fitted in the corresponding raceway recess. By so doing, when force that moves the shaft-like rolling elements in the axial direction occurs because of a skew, movement of the shaft-like rolling elements is restricted by the raceway recess. Furthermore, the retainers are arranged outside the raceway recesses. That is, the retainers each are not accommodated inside any of the raceway recesses. Thus, only the raceway recesses exhibit the effect of restricting movement of the shaft-like rolling elements due to a skew, and the retainers do not exhibit the effect of restricting the movement. In this way, with the above embodiment of the invention, unlike the existing art, movement of the retainers and the shaft-like rolling elements due to a skew is restricted not by bringing the retainers themselves into contact with the outer ring. Therefore, it is possible to prevent a situation that the retainers contact with the outer ring to cause the retainers to receive a large load. As a result, it is not necessary to apply process for improving the bending rigidity of each retainer, such as increasing the thickness of the plate and applying heat treatment. That is, it is possible to reduce the cost and weight of the retainers.

In the above embodiment, in a state where the shaft-like rolling elements are located in the raceway recesses at locations closest to a groove bottom of a corresponding one of the raceway grooves and each retainer is located closest to the groove bottom of a corresponding one of the raceway grooves with respect to the shaft-like rolling elements, a gap may be formed between the retainer and a groove bottom surface of a corresponding one of the raceway grooves.

Each shaft-like rolling element may be restricted by the raceway recesses from moving in an axial direction of the shaft-like rolling element or may be allowed to slightly move in the axial direction. In the above configuration, the phrase "the shaft-like rolling elements are located in the raceway recesses at locations closest to a groove bottom of a corresponding one of the raceway grooves" means restricted positions when movement of the shaft-like rolling elements are restricted by the raceway recesses, and means positions from which the shaft-like rolling elements move toward the groove bottom of each raceway groove in the raceway recesses and cannot be moved any more when movement of the shaft-like rolling elements are allowed. In addition, the retainer may be restricted from moving in the radial direction of the outer ring with respect to the shaft-like rolling elements or may be allowed to slightly move in the radial direction of the outer ring. In the above configuration, the phrase "the retainer is located closest to the groove bottom of each raceway groove with respect to the shaft-like rolling elements" means a restricted position when movement of the retainer is restricted with respect to the shaft-like rolling elements, and means a position from which the retainer moves toward the groove bottom of each raceway groove with respect to the shaft-like rolling elements and cannot be moved any more when movement of the retainer is allowed.

Then, in the above state, a gap is formed between each retainer and the groove bottom surface of a corresponding one of the raceway grooves. By so doing, even when a skew occurs, it is possible to prevent the retainer from contacting with the groove bottom surface of a corresponding one of the raceway grooves of the outer ring. That is, each retainer is able to prevent receiving a load from the groove bottom surface of a corresponding one of the raceway grooves without receiving a load from the raceway recesses. By so doing, it is possible to suppress an increase in bending rigidity of the retainers.

In the above embodiment, each retainer may be arranged at a gap from the side surfaces of a corresponding one of the raceway grooves. By so doing, it is possible to prevent each retainer from contacting with the side surfaces of a corresponding one of the raceway grooves. That is, each retainer is able to prevent receiving a load from the side surfaces of a corresponding one of the raceway grooves. By so doing, it is possible to suppress an increase in bending rigidity of the retainers.

In the above embodiment, furthermore, an opening portion of each raceway groove may be located on an inner side of a corresponding one of the retainers in the radial direction of the outer ring. By so doing, no portions of the outer ring are present on the inner side of each retainer in the radial direction of the outer ring. In the existing art, in order to restrict each retainer itself, protrusions are formed on the inner side of the retainer in the radial direction of the outer ring at the opening portion of a corresponding one of the raceway grooves. In contrast, in the above configuration, the opening portion of each raceway groove is located so that the protrusions are not present on the inner side of a corresponding one of the retainers in the radial direction of the outer ring. Thus, even when each retainer is moved inward in the radial direction of the outer ring with respect to the outer ring, it is possible to prevent the retainer from receiving a load from the components of the outer ring. By so doing, it is possible to suppress an increase in bending rigidity of the retainers.

In the above embodiment, furthermore, each of the shaft-like rolling elements may include a rolling surface portion that has a rolling surface on its outer periphery and protruding portions that protrude respectively from both end surfaces of the rolling surface portion in an axial direction thereof outward in the axial direction, the rolling surface portions may be fitted in the raceway recesses, the rolling surface of each rolling surface portion may be able to roll along a bottom surface of the raceway recess, and each of the protruding portions may be located outside the raceway recess and may be supported by the corresponding retainer.

By so doing, each retainer supports the protruding portions located outside the raceway recesses. Thus, each retainer is able to reliably achieve a state where the retainer is arranged outside the raceway recesses. Therefore, with the above configuration, unlike the existing art, movement of the retainers and the shaft-like rolling elements due to a skew is restricted not by bringing the retainers themselves into contact with the outer ring.

Furthermore, a distance between distal ends of both protruding portions may be larger than an opening width of each raceway recess. By so doing, the shaft-like rolling elements may be formed so that the protruding portions are not trapped inside the raceway recesses. Thus, it is possible to reliably have each retainer that supports the protruding portions not trapped in the raceway recesses.

In the above embodiment, furthermore, each retainer may further include: a pair of annular circulation path forming members that are arranged to face each other so as to sandwich the shaft-like rolling elements and that support both protruding portions of each shaft-like rolling element; and a coupling portion that couples the pair of circulation path forming members.

With the thus configured retainers, it is possible to effectively reduce cost and weight. Here, each intermediate member and a corresponding one of the retainers are relatively movable in the radial direction of the outer ring. Then, at the time of assembling during initial manufacturing and at the time of disassembling, as any of the intermediate members comes off from a corresponding one of the retainers, workability becomes poor.

Then, in the embodiment of the invention, furthermore, the sliding-type tripod constant velocity joint may further include a movement restricting portion that is provided between each intermediate member and a corresponding one of the retainers, that allows the retainer to move a predetermined distance in the radial direction of the outer ring with respect to the intermediate member and that, when the amount of relative movement in the radial direction of the outer ring between the retainer and the intermediate member exceeds the predetermined distance, restricts the relative movement.

By so doing, the movement restricting portion is able to prevent each retainer from coming off from a corresponding one of the intermediate members at the time of assembling or disassembling. Thus, assembling is considerably easy, and maintenance during disassembling is also considerably easy. In addition, the movement restricting portion allows relative movement between each retainer and a corresponding one of the intermediate members by a predetermined distance. Thus, when torque is transmitted between the tripod and the outer ring after assembling, even when any of the intermediate members moves with respect to the outer ring in the radial direction of the outer ring together with a corresponding one of the tripod shaft portions, a corresponding one of the retainers is able to stably retain the rolling elements at predetermined positions.

In the above embodiment, furthermore, the movement restricting portion may include a recess that is formed at one of the intermediate member and the retainer and that inserts the other one of the intermediate member and the retainer therein, and the recess may have ribs on both sides in the radial direction of the outer ring, wherein the other one of the intermediate member and the retainer may hook on any of the ribs. By so doing, it is possible to reliably exhibit the function of the movement restricting portion by the recess.

Furthermore, the other one of the intermediate member and the retainer may have a protrusion that protrudes toward the recess and that is inserted in the recess. The movement restricting portion is formed of the protrusion and the recess, so assembling of each intermediate member to a corresponding one of the retainers is further easy. In addition, the movement restricting portion is formed of the recess and the protrusion, so it is possible to allow relative movement between each retainer and a corresponding one of the intermediate members by a predetermined distance without increasing the size. Here, when the protrusion is provided and then each intermediate member is assembled to a corresponding one of the retainers, the protrusion needs to pass over the rib of the recess.

Then, the protrusion may be formed to be elastically deformable. In this way, by forming the protrusion to be elastically deformable, assembling of each intermediate member to a corresponding one of the retainers is easy. In addition, each intermediate member contributes to torque transmission, whereas each retainer does not contribute to torque transmission, so it is only necessary that each retainer is able to retain the rolling elements. Thus, each intermediate member may have a relative high rigidity, and each retainer may have a relatively low rigidity.

Then, in the above embodiment, the protrusion may be provided for each retainer. By providing the protrusion for each retainer, the protruding portion may be easily provided so as to be elastically deformable. As described above, when the protrusion is provided and then each intermediate member is assembled to a corresponding one of the retainers, the protrusion needs to pass over the rib of the recess.

Then, the ribs may be formed to be elastically deformable. By forming the ribs to be elastically deformable, assembling of each intermediate member to a corresponding one of the retainers is easy. In addition, as described above, each intermediate member contributes to torque transmission, whereas each retainer does not contribute to torque transmission, so it is only necessary that each retainer is able to retain the rolling elements. Thus, each intermediate member may have a relative high rigidity, and each retainer may have a relatively low rigidity.

Then, the recess may be provided for each retainer. By providing the recess for each retainer, the ribs of the recess may be easily provided so as to be elastically deformable.

In the above embodiment, each retainer may be formed by pressing a plate member. By so doing, it is possible to easily form the protrusion or the ribs of the recess so as to be elastically deformable. Thus, assembling of each intermediate member to a corresponding one of the retainers is easy.

In the embodiment of the invention, each retainer may include: a pair of annular circulation path forming members that are arranged to face each other so as to sandwich the shaft-like rolling elements and that allow the shaft-like rolling elements to circulate; and a pair of coupling portions that respectively couple portions located at both sides of the pair of circulation path forming members in the direction of the rotation axis of the outer ring, wherein the movement restricting portion may be provided between both end surfaces of the intermediate member in the direction of the rotation axis of the outer ring and the pair of coupling portions, respectively.

With the above configuration, the movement restricting portion is provided on each side of the tripod shaft portion. By so doing, it is possible to reliably prevent each retainer from coming off from a corresponding one of the intermediate members.

Furthermore, each intermediate member may be formed of a pair of members that are arranged separately so as to sandwich a corresponding one of the tripod shaft portions from both sides of the side surfaces of a corresponding one of the raceway grooves, the pair of members may be provided rockably with respect to a corresponding one of the tripod shaft portions and may be fitted around an outer peripheral surface of the tripod shaft portion, and the movement restricting portion may be provided between at least one of the pair of members and the retainer. With the above configuration, each intermediate member is formed of two separated members. By so doing, it is possible to easily assemble each intermediate member to a corresponding one of the tripod shaft portions. Furthermore, each intermediate member is formed of the two separated members, so it is possible to suppress contact between each intermediate member and a corresponding one of the raceway grooves of the outer ring at a side opposite to a surface that transmits torque.

Furthermore, as described above, even when each intermediate member is formed of two separated members, by forming each intermediate member so as to be able to fit the outer peripheral surface of a corresponding one of the tripod shaft portions, it is possible to prevent each intermediate member and each retainer from coming off from a corresponding one of the tripod shaft portions.

What is claimed is:

1. A sliding-type tripod constant velocity joint comprising:
   a cylindrical outer ring that has three raceway grooves on an inner peripheral surface thereof, the three raceway grooves extending in a direction of a rotation axis of the outer ring;
   a tripod that has a boss portion coupled to a shaft and three tripod shaft portions that extend from an outer peripheral surface of the boss portion outward in a radial direction of the boss portion and that are inserted in the corresponding raceway grooves;
   an intermediate member that is provided around an outer periphery of a corresponding one of the tripod shaft portions so as to be rockable with respect to the tripod shaft portion and that has a torque transmitting surface on an outer surface thereof, the torque transmitting surface facing side surfaces of a corresponding one of the raceway grooves;
   a plurality of shaft-like rolling elements that are provided between the side surfaces of each raceway groove and a corresponding one of the torque transmitting surfaces so as to be able to roll along the side surfaces of that raceway groove; and
   a retainer that supports the shaft-like rolling elements so that the shaft-like rolling elements are able to circulate around an outer periphery of a corresponding one of the intermediate members, wherein
   a raceway recess is formed on each of the side surfaces of each raceway groove and extends in the direction of the rotation axis of the outer ring, the raceway recesses in each raceway groove being separated by a certain width,
   portions of the shaft-like rolling elements, located adjacent to each of the side surfaces of each raceway groove, are fitted in the corresponding raceway recess, and are able to roll along a bottom surface of the corresponding raceway recess, and
   the retainers have a width which is smaller than the certain width between the raceway recesses in each raceway groove such that the retainers are arranged entirely outside the raceway recesses.

2. The sliding-type tripod constant velocity joint according to claim 1, wherein
   in a state where the shaft-like rolling elements are located in the raceway recesses at locations closest to a groove bottom of a corresponding one of the raceway grooves and each retainer is located closest to the groove bottom of a corresponding one of the raceway grooves with respect to the shaft-like rolling elements, a gap is formed between the retainer and a groove bottom surface of a corresponding one of the raceway grooves.

3. The sliding-type tripod constant velocity joint according to claim 1, wherein
   each retainer is arranged at a gap from the side surfaces of a corresponding one of the raceway grooves.

4. The sliding-type tripod constant velocity joint according to claim 1, wherein
   each of the shaft-like rolling elements includes a rolling surface portion that has a rolling surface on its outer periphery and protruding portions that protrude respectively from both end surfaces of the rolling surface portion in an axial direction thereof outward in the axial direction,
   the rolling surface portions are fitted in the raceway recesses,
   the rolling surface of each rolling surface portion is able to roll along a bottom surface of the raceway recess, and
   each of the protruding portions is located outside the raceway recess and is supported by the corresponding retainer.

5. The sliding-type tripod constant velocity joint according to claim 4, wherein
   a distance between distal ends of both protruding portions is larger than an opening width of each raceway recess.

6. The sliding-type tripod constant velocity joint according to claim 4, wherein
   each retainer includes: a pair of annular circulation path forming members that are arranged to face each other so as to sandwich the shaft-like rolling elements and that support both protruding portions of each shaft-like rolling element; and a coupling portion that couples the pair of circulation path forming members.

7. The sliding-type tripod constant velocity joint according to claim 1, wherein the retainer supports the shaft-like rolling elements so that the shaft-like rolling elements are able to circulate around an outer periphery of a corresponding one of the intermediate members and the retainer.

8. A sliding-type tripod constant velocity joint comprising:
a cylindrical outer ring that has three raceway grooves on an inner peripheral surface thereof, the three raceway grooves extending in a direction of a rotation axis of the outer ring;
a tripod that has a boss portion coupled to a shaft and three tripod shaft portions that extend from an outer peripheral surface of the boss portion outward in a radial direction of the boss portion and that are inserted in the corresponding raceway grooves;
an intermediate member that is provided around an outer periphery of a corresponding one of the tripod shaft portions so as to be rockable with respect to the tripod shaft portion and that has a torque transmitting surface on an outer surface thereof, the torque transmitting surface facing side surfaces of a corresponding one of the raceway grooves;
a plurality of shaft-like rolling elements that are provided between the side surfaces of each raceway groove and a corresponding one of the torque transmitting surfaces so as to be able to roll along the side surfaces of that raceway groove; and
a retainer that supports the shaft-like rolling elements so that the shaft-like rolling elements are able to circulate around an outer periphery of a corresponding one of the intermediate members, wherein
a raceway recess is formed on each of the side surfaces of each raceway groove and extends in the direction of the rotation axis of the outer ring,
portions of the shaft-like rolling elements, located adjacent to each of the side surfaces of each raceway groove, are fitted in the corresponding raceway recess, and are able to roll along a bottom surface of the corresponding raceway recess, and
the retainers are arranged outside the raceway recesses,
further comprising a movement restricting portion that is provided between each intermediate member and a corresponding one of the retainers, that allows the retainer to move a predetermined distance in the radial direction of the outer ring with respect to the intermediate member and that, when the amount of relative movement in the radial direction of the outer ring between the retainer and the intermediate member exceeds the predetermined distance, restricts the relative movement.

9. The sliding-type tripod constant velocity joint according to claim 8, wherein
the movement restricting portion includes a recess that is formed at one of the intermediate member and the retainer and that inserts the other one of the intermediate member and the retainer therein,
the recess has ribs on both sides in the radial direction of the outer ring, wherein the other one of the intermediate member and the retainer may hook on any of the ribs,
the other one of the intermediate member and the retainer has a protrusion that protrudes toward the recess and that is inserted in the recess, and
the protrusion is formed to be elastically deformable.

10. The sliding-type tripod constant velocity joint according to claim 8, wherein
each retainer includes: a pair of annular circulation path forming members that are arranged to face each other so as to sandwich the shaft-like rolling elements and that allow the shaft-like rolling elements to circulate; and a pair of coupling portions that respectively couple portions located at both sides of the pair of circulation path forming members in the direction of the rotation axis of the outer ring, wherein
the movement restricting portion is provided between both end surfaces of the intermediate member in the direction of the rotation axis of the outer ring and the pair of coupling portions, respectively.

11. The sliding-type tripod constant velocity joint according to claim 8, wherein
each intermediate member is formed of a pair of members that are arranged separately so as to sandwich a corresponding one of the tripod shaft portions from both sides of the side surfaces of a corresponding one of the raceway grooves,
the pair of members are provided rockably with respect to a corresponding one of the tripod shaft portions and are fitted around an outer peripheral surface of the tripod shaft portion, and
the movement restricting portion is provided between at least one of the pair of members and the retainer.

12. A sliding-type tripod constant velocity joint comprising:
a cylindrical outer ring that has three raceway grooves on an inner peripheral surface thereof, the three raceway grooves extending in a direction of a rotation axis of the outer ring;
a tripod that has a boss portion coupled to a shaft and three tripod shaft portions that extend from an outer peripheral surface of the boss portion outward in a radial direction of the boss portion and that are inserted in the corresponding raceway grooves;
an intermediate member that is provided around an outer periphery of a corresponding one of the tripod shaft portions so as to be rockable with respect to the tripod shaft portion and that has a torque transmitting surface on an outer surface thereof, the torque transmitting surface facing side surfaces of a corresponding one of the raceway grooves, wherein the intermediate member is formed of a pair of members that are arranged separately so as to sandwich a corresponding one of the tripod shaft portions from both sides of the side surfaces of a corresponding one of the raceway grooves;
a plurality of shaft-like rolling elements that are provided between the side surfaces of each raceway groove and a corresponding one of the torque transmitting surfaces so as to be able to roll along the side surfaces of that raceway groove; and
a retainer that supports the shaft-like rolling elements so that the shaft-like rolling elements are able to circulate around an outer periphery of a corresponding one of the intermediate members, wherein
a raceway recess is formed on each of the side surfaces of each raceway groove and extends in the direction of the rotation axis of the outer ring,
portions of the shaft-like rolling elements, located adjacent to each of the side surfaces of each raceway groove, are fitted in the corresponding raceway recess, and are able to roll along a bottom surface of the corresponding raceway recess, and
the retainers are arranged outside the raceway recesses.

* * * * *